March 27, 1973     H. A. STORCK     3,723,304
OMNIOLOGICAL FILTER AND PROCESS
Filed March 24, 1970     3 Sheets-Sheet 1
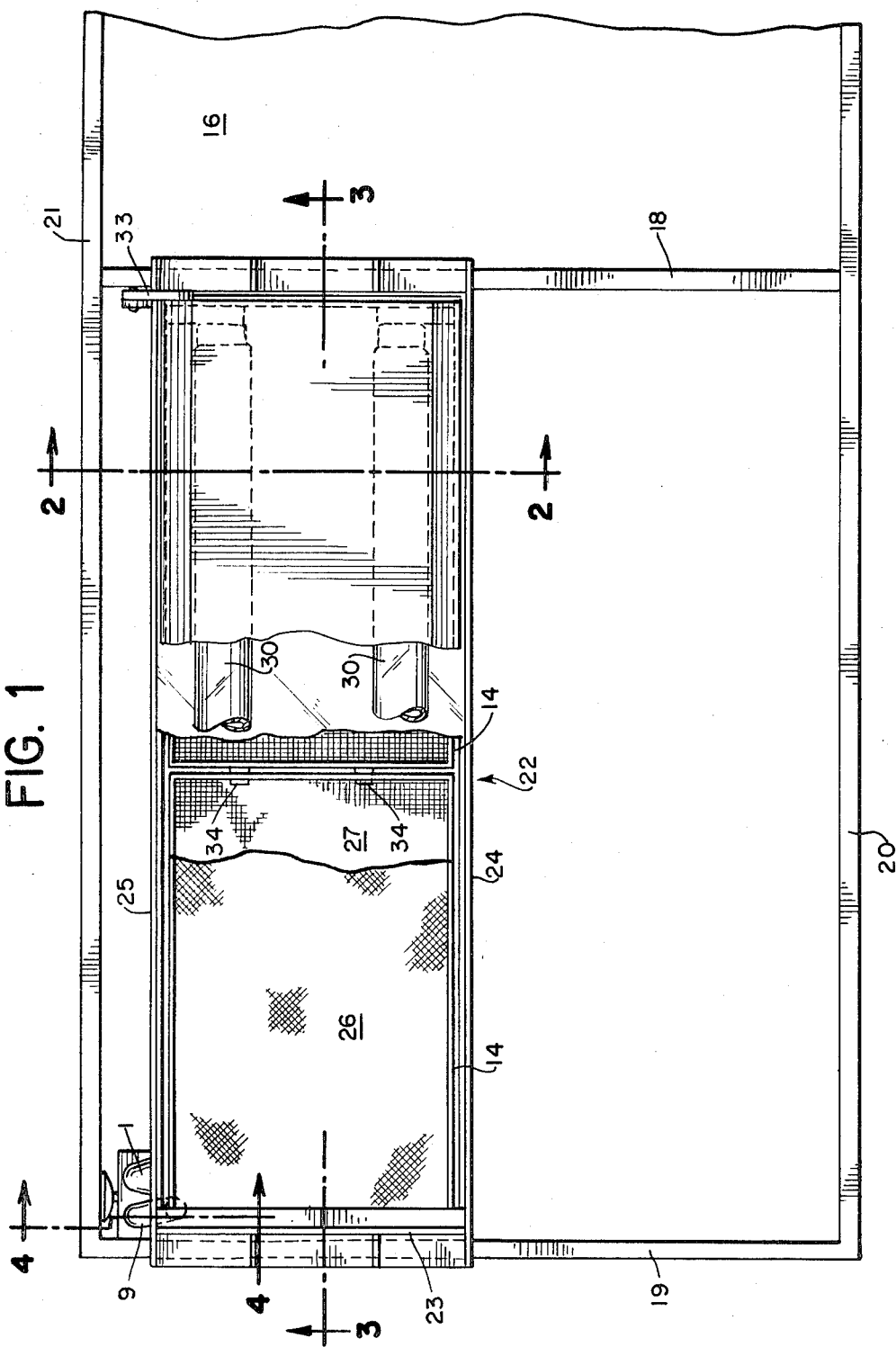
INVENTOR.
HAROLD A. STORCK
BY
ATTORNEYS

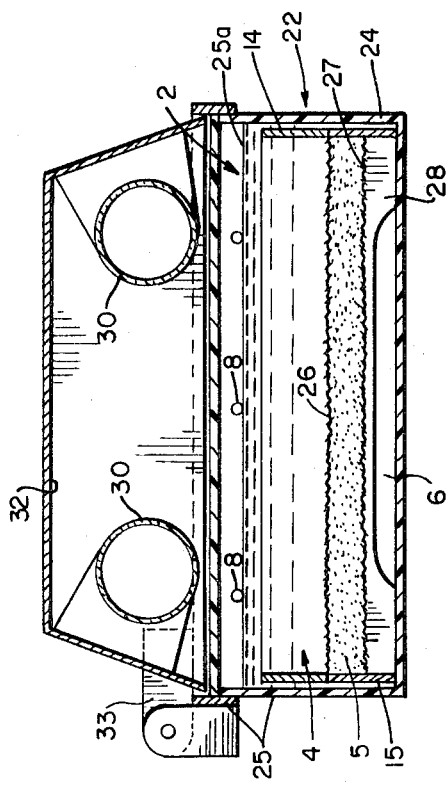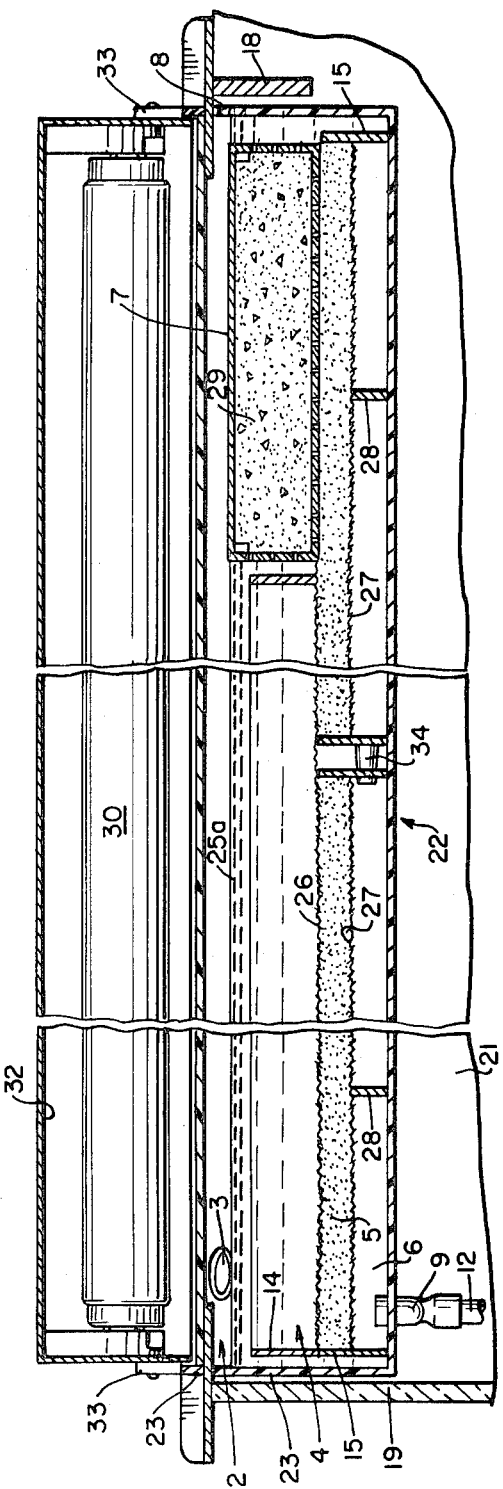

March 27, 1973

H. A. STORCK

3,723,304

OMNIOLOGICAL FILTER AND PROCESS

Filed March 24, 1970

*INVENTOR.*
HAROLD A. STORCK

BY

*Pennie, Edmonds, Morton, Taylor & Adams*

ATTORNEYS

# United States Patent Office 3,723,304
Patented Mar. 27, 1973

3,723,304
OMNIOLOGICAL FILTER AND PROCESS
Harold A. Storck, P.O. Box 2034, Suva, Fiji
Filed Mar. 24, 1970, Ser. No. 22,350
Int. Cl. E04h 3/16
U.S. Cl. 210—11
9 Claims

ABSTRACT OF THE DISCLOSURE

Solid and soluble pollutants are removed from water by means of an apparatus and a process wherein the water is filtered through pads of living marine thread-algae in the presence of light energy entrapping solid pollutants and removing soluble pollutants by photosynthesis.

SUMMARY OF THE INVENTION

This invention relates to a method and apparatus for removing solid and soluble pollutants from water. More specifically the invention relates to a method and apparatus for maintaining fish and other aquatic organisms in closed system aquaria and is particularly directed to maintaining fish, especially marine fish in closed system aquaria by providing a continuous combined mechanical filtration and biochemical purification system.

It is an object of this invention to provide a water purification system in which the polluted water will pass through a filtration medium which contacts bacteria and soluble inorganic mineral compounds with oxygen and isolates the bacteria and other solid pollutants within the filtration medium which is separate and distinct from the water source.

Another object of the invention is to provide a water purification system of the above type suitable for use with aquariums but maintained separate from the aquarium. A further object of this invention is to provide an aquarium filtration system which will require substantially no manual cleaning with continuous water recirculation and a minimum of maintenance and care.

Other objects of the invention are to provide a filtration system for use in fish aquariums, particularly salt water fish aquariums, which requires no water change, is of simple construction, easily inserted in or removed from an aquarium, inexpensive to manufacture, compact and extremely efficient in operation and simple in design.

Other objects and advantages of the present invention will become apparent to those skilled in the art from a consideration of the following summary of the invention and the description of the drawing and the preferred embodiment of the invention.

Aquarium water, for example, which is maintained in an agitated condition in the aquarium is drawn with its waste matter into the filter chamber by conventional means. The polluted water is then brought into contact with an entangled pad of living marine thread-algae. The algae pad stops and entraps about fifty percent of the solids suspended in the aquarium water. The algae pad which acts as a filter also isolates and entraps bacteria and other organisms present in the aquarium water within itself. These microbes break down and transform and convert waste matter in the aquarium water into simpler more basic products including soluble gases which are dissipated into the atmosphere by aeration. The other final products of the organic decay occurring in the algae pad are nitrates and phosphates. These along with other trace elements and minerals are assimilated by the algae. The assimilation of this food causes the algae to proliferate very rapidly. Thus the marine thread-algae pad need never be replaced and in fact may have to be thinned from time to time. Discarding the surplus algae also finally removes any harmful waste assimilated by it. Growth of the algae insures a continuous supply of this excellent filtration material. During the flow of aquarium water through the filtration system, hereinafter sometimes referred to as the "omniological filter," light energy in the lower spectrum range is provided to carry out photosynthesis.

During photosynthesis the marine thread-algae produces oxygen in the form of oxygen bubbles. The aquarium water flowing through the omniological filter is directed so that it intimately contacts the oxygen bubbles entrapped in the algae pad. The oxygen reacts with and destroys bacteria harmful to fish and other life forms as well as bleaching the water to maintain it in a colorless state.

Optionally a sand filter bed may be provided through which the aquarium water is passed after it is contacted by and passes through the entangled pad of living marine thread-algae prior to being returned to the aquarium. Any suspended solids remaining in the aquarium water are caught and held by the sand bed primarily on the surface of the bed.

Optionally the omniological filter may also be provided with activated carbon through which any desired amount of the aquarium water may be passed either before or after it contacts the pad of entangled marine thread-algae to remove discoloring pollutants as well as soluble gases which are difficult to remove by other means.

BRIEF DESCRIPTION OF THE DRAWING AND PREFERRED EMBODIMENT

A preferred embodiment of the invention has been chosen for purposes of illustration and description, and is shown in the accompanying drawing wherein:

In the drawing:

FIG. 1 is a plan view of an aquarium equipped with an omniological filter in accordance with the present invention.

FIG. 2 is a cross sectional view of the omniological filter taken along the lines 2—2 of FIG. 1.

FIG. 3 is a longitudinal section view of the omniological filter taken along the lines 3—3 of FIG. 1.

Figure 4:
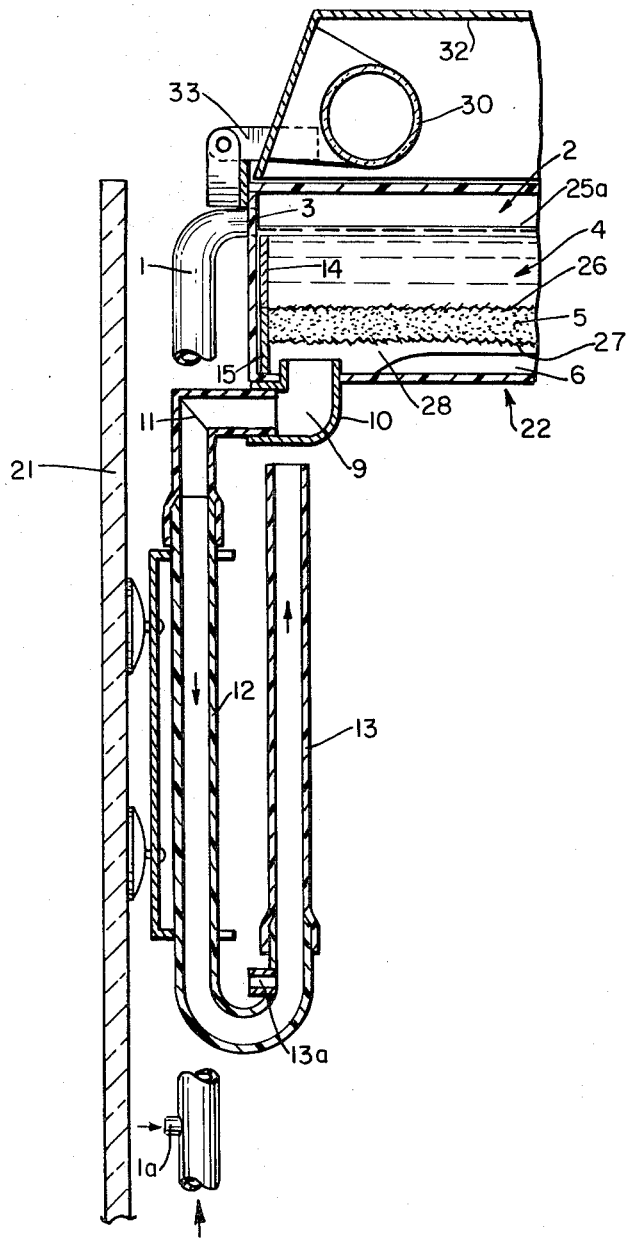
FIG. 4 is a cross sectional detail view of the inlet and outlet flow pipes used in conjunction with the omniological filter taken along the lines 4—4 of FIG. 1.

Referring now more particularly to the drawing, in FIG. 1 is shown an aquarium 16 with side walls 19, 20 and 21. Set into the aquarium and supported there by wall 19 and support bracket 18 is an omniological filter device 22 which has sides 23, 24 and 25 which together with a bottom plate comprise filter chamber 2. Well agitated aquarium water is drawn into the omniological filter through airlift pipe 1 by conventional airlift system means, for example, a stream of air bubbles introduced at the bottom end of the airlift pipe 1a, which causes a strong upward flow of water. This aquarium water flow causes with it waste matter which enters the filter chamber 2 at inlet port 3 to water level 25 and continuously flow through the various sections of the omniological filter for processing. The water as it enters the filter chamber spreads out in the algae chamber 4 where its load of suspended matter is brought in contact with a dense entangled pad of living marine thread-algae. All large particles are stopped and held by the algae in the first contact, where they may be removed daily if desired.

Provision is made in the design of the device by conventional means to control proportionately the lateral flow of water through the algae mass 4 or downwards through the sand filter bed. When the flow is at its normal balance, preferably about 90 percent of the water may be filtered through the sand bed 5 before returning to the aquarium via the drain area 6 and the gravity outlet 9.

In this preferred flow pattern there is a gradual slowing down of the lateral flow of aquarium water which allows the settling out or trapping of almost all suspended matter before the water reaches the activated carbon container 7 which preferably is perforated, and the overflow ports 8.

In this preferred flow pattern at least about 50 percent of the suspended solids are caught and held by the marine thread-algae and the rest settles out and is held by the sand bed, mostly on the surface of the sand.

One preferred method for controlling the directional flow is achieved in the "Omniological Filter" by regulating the airflow to the input airlift 1 and relating it to the outflow from the gravity outlet 9. The total flow through the sand bed can be greatly increased by attaching an airlift to the gravity outlet to assist the drain off. When it is desired to pass water through the carbon-box and overflow parts air can be increased on the inlet or reduced at the gravity outlet. Where no airlift is used to assist the gravity outlet the outflow from this point is controlled by turning upwards to any desired degree an elbow bend 11 which fits into and pivots in the outlet fitment 10. Elbow bend 11 may optionally have an extension 12 where an airlift assist 13 is used on the gravity outlet the resistance created in the airlift pipe is enough to allow an overflow to be achieved by simply increasing the air to the input airlift and cutting back as much as necessary on the outlet airlift at entrance 13a.

To facilitate the servicing of the omniological filter, when abuse makes it necessary, all of the functional elements have been designed in such a way that they can be removed from the filter chamber as separate units.

The preferred filter chamber 2 as shown in the drawing may be fabricated or moulded, for example from ⅛ inch thick sheet plastic, such as for example acrylic or polyvinyl chloride which is unaffected by the chemical action of salt water and strong enough to support its own weight when suspended by lugs, for example, or other conventional means for attaching the chamber to the aquarium walls at each end.

Algae tray 14 may simply consist of a plastic frame with a screen 26 of gauze, for example, for the bottom. This screen may preferably sit directly upon the surface of the sand. The algae tray allows the complete removal of the whole entangled algae pad without disturbing the sandbed filter.

Each filter pad 15 is preferably made from plastic in the form of a tray having, for example, a very fine but strong nylon screen 27 built into its center. The screen is preferably supported about ½ inch off the floor of the filter chamber by the outer frame and usually two or more screen supports 28. The screen supports have an arch in the center to allow a free flow of water from all parts of the pad. The half of the tray which is above the nylon screen is filled with preferably fine sand and the lower edge of the tray fits flush on the floor of the filter chamber. In the drawing a preferred design is shown in which two filter pads are used, one being plugged into the other by means of two tapered pipes 34 which protrude from the end of one pad and mate with holes on the adjoining end of the other, thus allowing the water filtering through the sand-beds to flow freely to the outlet. The entry of water from under the edges of the trays, where they sit on the floor of the filter chamber, is effectively stopped by fine particles of sand which block this crack. These filter-pads can be removed by first lifting out the algae tray 14 and the activated carbon box 7 and uncoupling the two pads and lifting them out one at a time. The pads are designed to a module allowing the same pads to be used in larger sized filter chambers simply by adding the necessary number of pads to suit the length of the chamber.

The activated carbon container may preferably be a simple perforated box which allows a free flow of water through the carbon granules 29. Beside its use for containing carbon the box can be used to contain ion-exchange resins or any other reagent in granulated form.

The type of light used and the manner in which it is applied will determine the amount of algae photosynthesis effected, and hence the amount of converted organic waste finally disposed of.

The most suitable source of light energy to meet the requirement of the preferred omniological filter described is fluorescent lighting which may preferably be provided by, for example, fluorescent tubes and those producing as much as their light in the spectrum range which is most usable by the algae. Combinations of fluorescent light sources and incandescent light sources may be used. Such light sources 30 are provided by utilization, for example, of a light gauge aluminum hood with a mirror polished reflecting surface 32. The hood is provided with well known lighting fixtures and may be attached, and positioned for easy removal by swivel means, such as, for example, hinge 33. In operation use has been made of two 20 watt fluorescent tubes producing light relatively high in blue and low in green, commercial fluorescent tubes, such as "Grow Lux" and "Cool-white" may be used in this connection. The light source should be maintained in relatively close proximity to the living marine thread-algae. When using two 20 watt "Grow Lux" fluorescent tubes satisfactory results have been achieved by maintaining the light source at a distance of from about 1 inch to about 2.5 inches from the top of the marine thread-algae pad. It has recently been found that a new type of incandescent light source, i.e. incandescent lamps of 150 watts which reflect back about 75 percent of their heat producing rays can be used as the light sources either alone or in combination with the above mentioned type light source.

The omniological filter simplifies the keeping of marine fish, and other forms of marine life, in closed system aquaria, completely eliminates or renders harmless all of those products of organic decay which normally accumulate in the aquarium to the detriment of its inhabitants and eventually necessitates the changing of water or the loss of specimens.

These pollutants are mainly organic in origin and are constantly being produced by the metabolism of the aquarium, i.e. uneaten particles of food, metabolic excreta, including urine and waste tissue, and the carcasses of organisms which die in the aquarium. Inorganic pollutants which accumulate are usually soluble mineral salts which are introduced in minute quantities with feeding and with fresh topping up water used to replace evaporated water.

The process of purification carried out by the omniological filter is mechanical and biochemical. The omniological filter is designed to encourage and foster an enormous concentration of bacteria and other organisms in an area remote from the aquarium. Here under the ideal conditions provided these microbes are able to break down, transform and convert, all of the waste matter that comes their way to more basic forms which are then further processed. An important mechanical function of the process is in the actual isolation of the active microbe mass from the aquarium where their unbridled proliferation is harmful to the inhabitants. The organic decomposition which takes place changes the protein rich waste into several new products, some of these are soluble gases, and these are dissipated into the atmosphere by the vigorous aeration provided. Most notable of the other final products of organic decay are nitrates and phosphates which constitute excellent plant nutrient. These, along with other trace elements and minerals, are assimilated by the algae. In utilizing the plant food the algae proliferate very rapidly and in proportion to the amount of waste processed.

Use is made of concentrated cool fluorescent light, for example, to provide the light energy necessary for photosynthesis. In the use of an artificial light source it is important to use light of the best spectral range for the promotion of algae growth and the omniological filter uses light sources giving light in the lower spectrum range. The light source is placed in close proximity to the surface of the water in the filter chamber for maximum efficiency.

Present indications are that 1 watt of proper light energy per gallon of aquarium water is sufficient to take care of the waste from a well stocked aquarium.

In the process of photosynthesis a great deal of oxygen is produced by the algae which has known disinfecting qualities. In the omniological filter the water-flow is so directed as to be kept in intimate contact with the oxygen bubbles which are held trapped in the algae mass, and in this way valuable use is made of the disinfecting properties of the oxygen. Oxygen is held by many authorities to be far more active in the destruction of certain bacteria which can be harmful to the aquarium fishes than Ozone ($O_3$).

At certain stages in the setting up of the aquarium there can occur an imbalance, or a flush of harmful bacteria, or an infestation of parasitic disease causing organisms. When this situation exists it is important that the total water flow is through the fine sand bed and, although the sand itself cannot filter out all of these bacteria, it can and does build upon its surface the sort of medium which will hold and culture a very large percentage of the organisms in very close proximity to each other. Under these conditions natures own processes will very quickly bring back a state of normality where no particular bacterial strain has supremacy. When balance is restored the whole filter chamber becomes the habitat of hundreds of different species of micro-organisms, many of them quite large. These free-swimming planktonic, zooplanktonic and phytoplanktonic organisms can be of value in setting up the ocean-like state that is desired to be achieved. They provide food for many of the smaller inhabitants of the aquarium and it is at this stage that there is benefit in allowing portion of the water carrying some of these organisms to pass through the overflow ports 8 into the aquarium. Also, when the thread-algae are blooming and are producing motile algae spore, it is useful to be able to hold the spore back, rather than to let them pass into the aquarium where they would attach themselves to the aquarium furniture and glass surfaces.

By its nature the omniological filter goes a long way towards being self-maintaining. In fact the preferred embodiment herein described, when properly operated can maintain sufficient purified water for a very satisfactory number of fish in an adequately sized aquarium on the self-maintaining basis, i.e. requiring only the periodic removal of algae. This is because almost all of the solids which are held in the first instance by the filtering mediums, i.e. the entangled marine thread-algae pads and the sand bed surface, are so quickly converted biologically into solubles, that in a properly stocked aquarium the sand bed never crusts over or chokes. However, the omniological filter is constructed to allow fast and efficient occasional servicing.

While a preferred embodiment of the invention has been described and illustrated it is apparent that changes and modifications may be made without departing from the spirit and scope of the invention set forth in the appended claims.

What is claimed is:

1. An apparatus for treating water to remove solid and soluble pollutants therefrom which comprises:
    (a) containing means through which said water passes during treatment, said containing means being operably positioned within an aquarium;
    (b) a stationary pad of living, entangled marine thread-algae maintained within said containing means;
    (c) inlet means which allows said water to pass through said pad of marine thread-algae;
    (d) means providing light energy to said marine thread-algae sufficient to promote photosynthesis by said marine thread-algae and concomitantly remove pollutants from the water by reaction with oxygen produced by such photosynthesis; and
    (e) outlet means permitting said water to pass out of the containing means after treatment.

2. The apparatus of claim 1 further comprising a sand layer through which at least a portion of said water passes.

3. The apparatus of claim 1 further comprising an elbow pivotally attached to said outlet for controlling water flow through the containing means.

4. The apparatus of claim 1 comprising an elbow and a U-shaped tubular member connected thereto for controlling water flow through the containing means.

5. The apparatus of claim 2 further comprising means for maintaining the pad of marine thread-algae and the sand layer in close relationship.

6. A process for treating water in an aquarium to remove solid and soluble pollutants therefrom which comprises:
    (a) contacting water in an aquarium with a stationary pad of living, entangled marine thread-algae;
    (b) filtering the water through the pad of marine thread-algae to remove solids;
    (c) contacting the pad of marine thread-algae with light energy sufficient to promote photosynthesis by said marine thread-algae; and
    (d) reacting pollutants with oxygen produced by such photosynthesis while intimately associated with the pad of marine thread-algae.

7. The process of claim 6 further comprising passing the water through a sand layer.

8. The process of claim 6 further comprising passing the water through activated carbon.

9. The process of claim 6 further comprising regulating the water flow by air entrainment.

References Cited

UNITED STATES PATENTS

| | | | |
|---|---|---|---|
| 2,676,921 | 4/1954 | Vansteenkiste | 210—169 |
| 3,125,065 | 3/1964 | Willinger | 119—5 |
| 3,155,609 | 11/1964 | Pampel | 210—3 |
| 3,273,717 | 9/1966 | Canterbury | 210—169 |
| 3,314,396 | 4/1967 | Willinger | 119—5 |
| 3,565,797 | 2/1971 | Gresham | 210—151 X |

FOREIGN PATENTS

| | | | |
|---|---|---|---|
| 904,588 | 8/1962 | Great Britain | 210—169 |

REUBEN FRIEDMAN, Primary Examiner

T. G. WYSE, Assistant Examiner

U.S. Cl. X.R.

210—17, 151, 169